US008675751B2

(12) United States Patent
Cannon et al.

(10) Patent No.: US 8,675,751 B2
(45) Date of Patent: Mar. 18, 2014

(54) META-CARRIER EMBEDDING TECHNIQUE WITH IMPROVED PERFORMANCE FOR BPSK, MSK, AND O-QPSK MODULATION

(75) Inventors: Richard Hollingsworth Cannon, Mesa, AZ (US); Michael Beeler, Jefferson, MD (US); Cris Mamaril, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 361 days.

(21) Appl. No.: 13/219,221

(22) Filed: Aug. 26, 2011

(65) Prior Publication Data

US 2011/0310933 A1 Dec. 22, 2011

Related U.S. Application Data

(63) Continuation-in-part of application No. 13/024,402, filed on Feb. 10, 2011, and a continuation-in-part of application No. 13/044,446, filed on Mar. 9, 2011, and a continuation-in-part of application No. 13/024,951, filed on Feb. 10, 2011.

(60) Provisional application No. 61/322,257, filed on Apr. 8, 2010, provisional application No. 61/389,130, filed on Oct. 1, 2010, provisional application No. 61/360,213, filed on Jun. 30, 2010, provisional application No. 61/503,574, filed on Jun. 30, 2011.

(51) Int. Cl.
*H04K 1/10* (2006.01)
*H04L 27/28* (2006.01)

(52) U.S. Cl.
USPC ........... 375/260; 375/144; 375/148; 375/271; 375/325; 375/327

(58) Field of Classification Search
USPC ................. 375/130, 140–153, 211, 214–215, 375/259–261, 264, 268, 271, 279–285, 295, 375/298, 300, 302, 308, 316, 322–349
See application file for complete search history.

(56) References Cited

U.S. PATENT DOCUMENTS 4,660,196 A  4/1987  Gray et al.
5,245,612 A  9/1993  Kachi et al.
(Continued)

OTHER PUBLICATIONS

Carrier ID Forum—Carrier ID Video Specification, World Broadcasting Unions, International Satellite Operations Group [on-line]. Washington, DC, Nov. 18, 2009 [retrieved on Aug. 27, 2012]. <http://www.rfi.eui.org/downloads%5CNbr.1-WBU-ISOG-SUIRG-CarrierIDSpecForVideo.com>.

*Primary Examiner* — Sam K Ahn
*Assistant Examiner* — James M Perez
(74) *Attorney, Agent, or Firm* — Booth Udall Fuller, PLC

(57) ABSTRACT

A method of embedding information within a burst carrier signal, the method comprising modulating meta-data using a modulator such that a meta-carrier signal results, lowering a Power Spectral Density (PSD) of the meta-carrier signal by Direct Sequence Spread Spectrum (DSSS) chipping the meta-carrier signal using a linear Pseudo-Random Number (PRN) sequence, embedding one or more modulated symbols of the meta-carrier signal within an unused portion of one or more quadrants of a modulation constellation of a burst carrier signal such that a composite carrier signal results, and synchronously transmitting the composite carrier signal using a transmitter such that symbols of the meta-carrier signal are synchronized with symbols of the burst carrier signal.

40 Claims, 14 Drawing Sheets

(56) References Cited

U.S. PATENT DOCUMENTS

| | | | |
|---|---|---|---|
| 5,537,397 | A | 7/1996 | Abramson |
| 6,233,271 | B1 | 5/2001 | Jones et al. |
| 6,430,213 | B1 * | 8/2002 | Dafesh .................. 375/146 |
| 6,934,317 | B1 * | 8/2005 | Dent ..................... 375/140 |
| 6,985,512 | B1 | 1/2006 | McDermott et al. |
| 7,227,884 | B2 | 6/2007 | McDermott |
| 7,433,391 | B2 | 10/2008 | Stafford et al. |
| 7,596,170 | B2 | 9/2009 | McDermott et al. |
| 7,643,801 | B2 * | 1/2010 | Piirainen ............. 455/114.2 |
| 7,876,784 | B1 * | 1/2011 | Lee ...................... 370/473 |
| 8,059,749 | B2 * | 11/2011 | Sorrells et al. ......... 375/297 |
| 8,553,595 | B2 * | 10/2013 | Laroia et al. ........... 370/310 |
| 2005/0025256 | A1 * | 2/2005 | Van De Beek et al. ... 375/308 |
| 2005/0176436 | A1 * | 8/2005 | Mantravadi et al. ..... 455/450 |
| 2006/0114815 | A1 * | 6/2006 | Hasegawa et al. ....... 370/208 |
| 2006/0274641 | A1 * | 12/2006 | Grieco et al. .......... 370/210 |
| 2007/0206963 | A1 * | 9/2007 | Koc ...................... 398/202 |
| 2007/0270170 | A1 * | 11/2007 | Yoon et al. ............ 455/509 |
| 2007/0286238 | A1 * | 12/2007 | Wang et al. ............ 370/478 |
| 2008/0137714 | A1 * | 6/2008 | Lionel et al. ........... 375/130 |
| 2009/0220019 | A1 * | 9/2009 | Kwon et al. ............ 375/261 |
| 2009/0296662 | A1 * | 12/2009 | Laroia et al. ........... 370/335 |
| 2010/0157833 | A1 * | 6/2010 | Vrcelj et al. ........... 370/252 |
| 2011/0051781 | A1 * | 3/2011 | Pratt et al. ............. 375/140 |

* cited by examiner

FIG. 1 – PRIOR ART (BPSK)

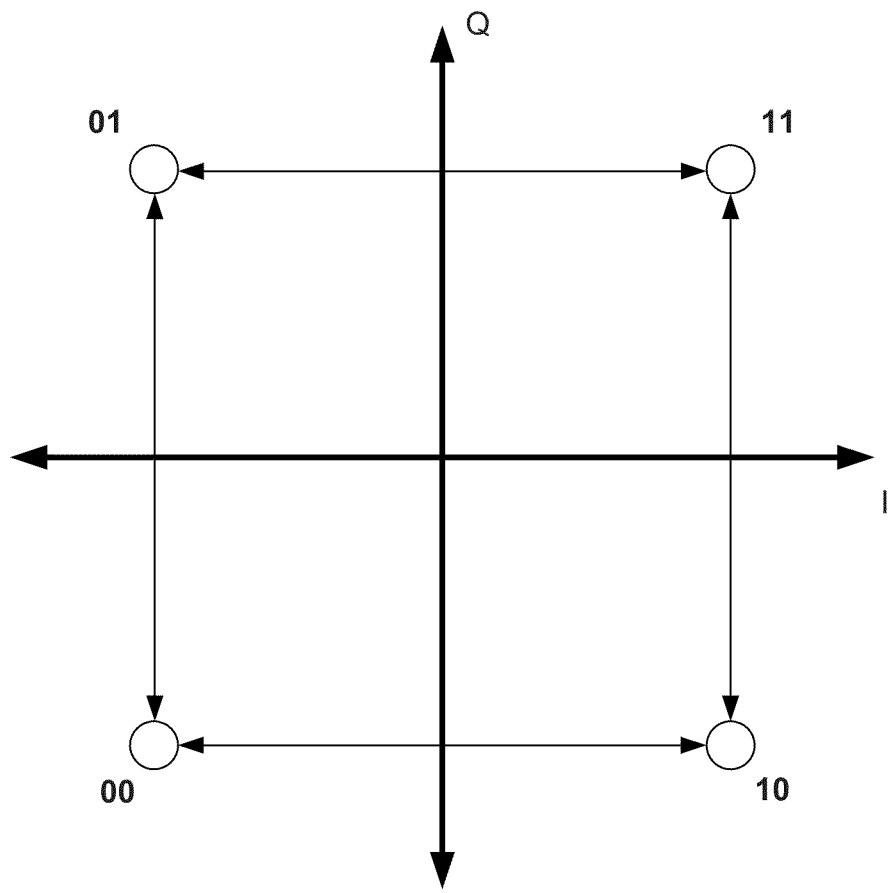
FIG. 3A – PRIOR ART (MSK OR O-QPSK)

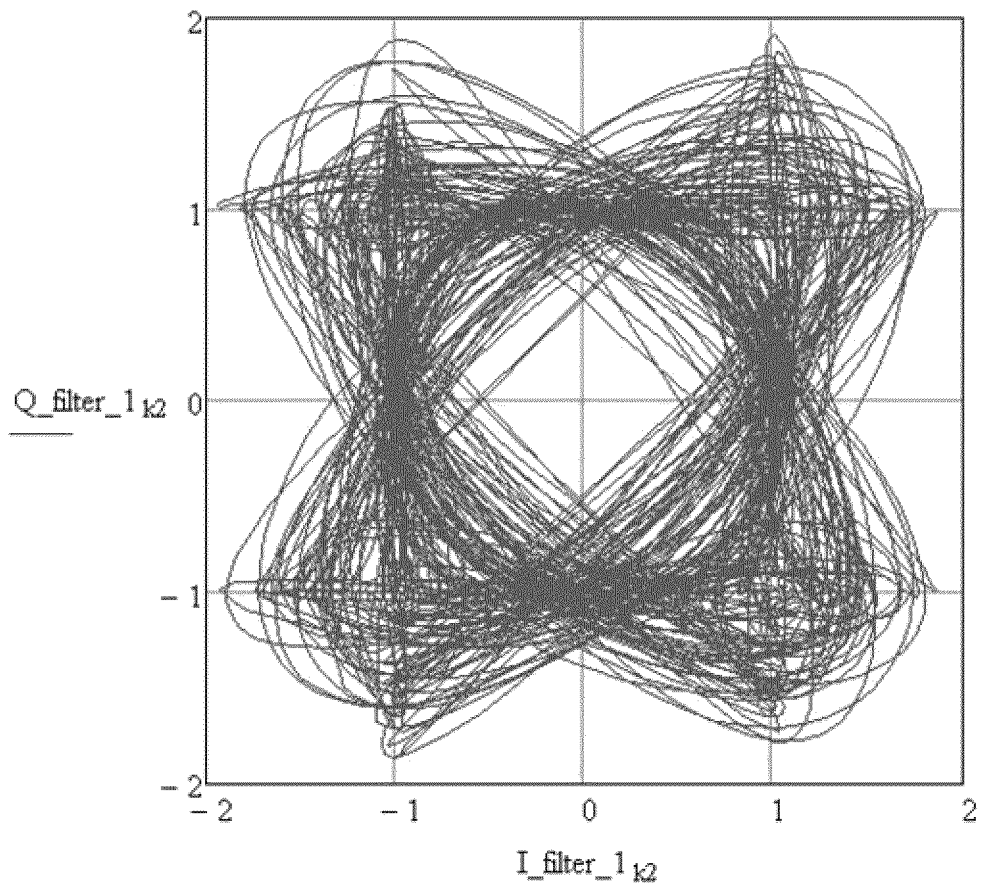
FIG. 3B – PRIOR ART (MSK OR O-QPSK) CONTINUOUS CONSTELLATION

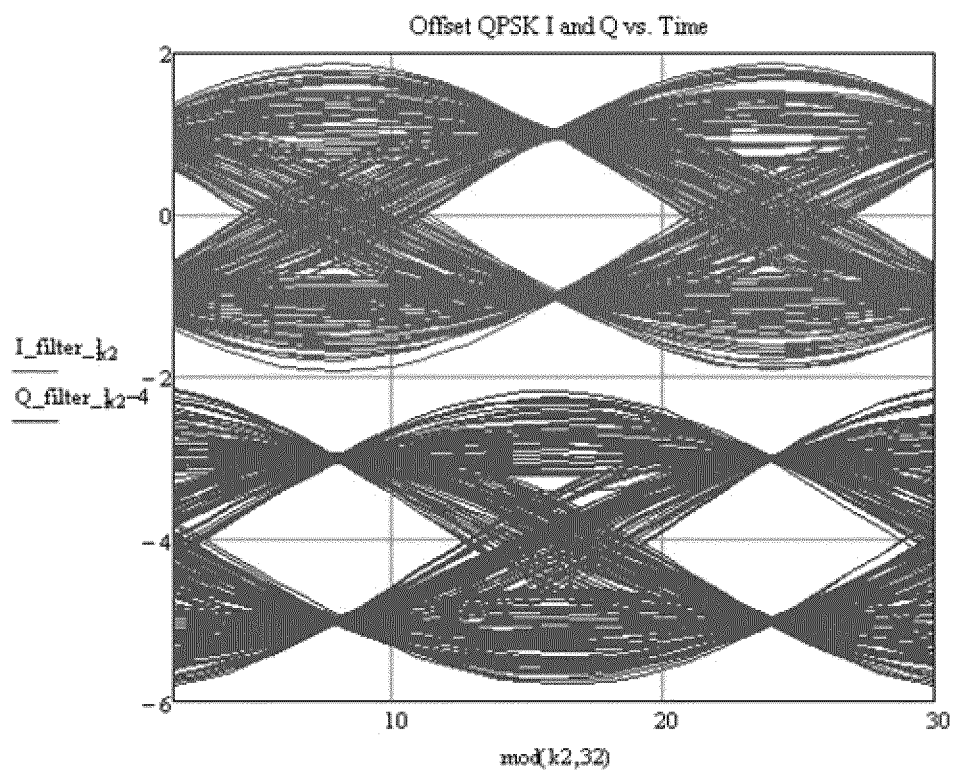
FIG. 3C – PRIOR ART (MSK OR O-QPSK) EYE
DIAGRAMS OF I AND Q CHANNELS VERSUS TIME

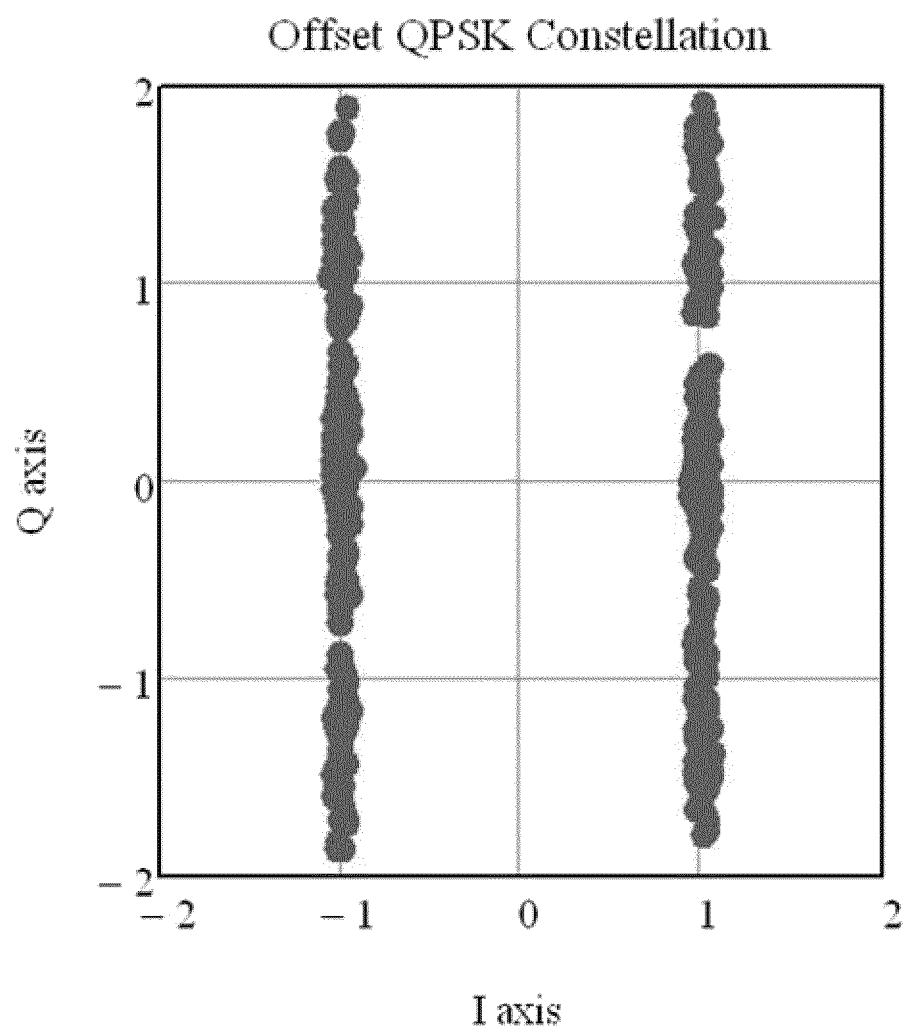
FIG. 3D – PRIOR ART (MSK OR O-QPSK) I CHANNEL AT CENTER

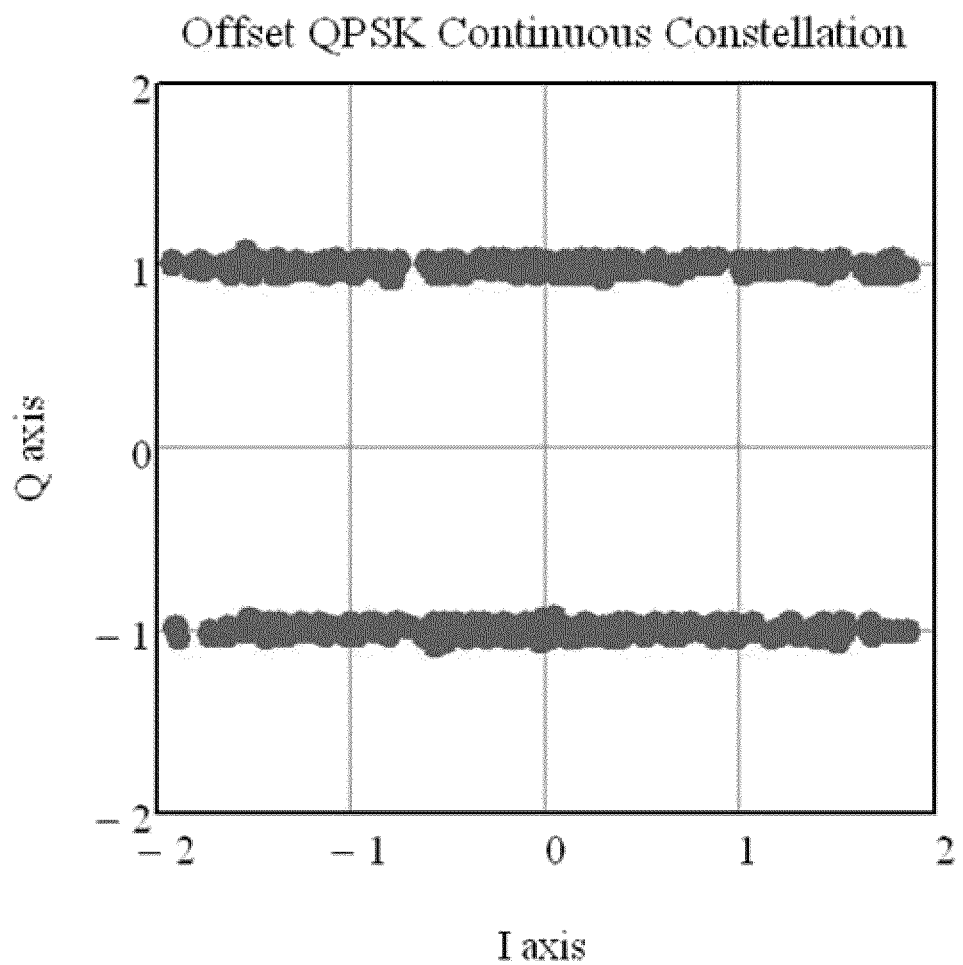
FIG. 3E – PRIOR ART (MSK OR O-QPSK) Q CHANNEL AT CENTER

METHOD-CARRIER EMBEDDING TECHNIQUE WITH IMPROVED PERFORMANCE FOR BPSK, MSK, AND O-QPSK MODULATION

CROSS REFERENCE TO RELATED APPLICATIONS

This application is a continuation in part of currently pending U.S. patent application Ser. No. 13/024,402, entitled "Embedded Meta-Carrier with Spread Spectrum Via Overlaid Carriers" to Michael Beeler, et al., which was filed on Feb. 10, 2011, pending U.S. patent application Ser. No. 13/044,446, entitled "Embedded Meta-Carrier with Spread Spectrum for Periodic-Burst Carriers via Overlaid Carriers" to Michael Beeler, et al., which was filed on Mar. 9, 2011, and U.S. patent application Ser. No. 13/024,951, entitled "A Method and System for Transmission of Identification via Metadata for Repeating Relays using Spread-Spectrum Technology" to Frederick Morris, et al., which was filed on Feb. 10, 2011, the disclosures of which are herein incorporated by reference in their entirety. This document claims the benefit of the filing date of U.S. Provisional Patent Application No. 61/322,257, entitled "Embedded Meta-Carrier with Spread Spectrum via Overlaid Carriers" to Michael Beeler et al., which was filed on Apr. 8, 2010, U.S. Provisional Patent Application No. 61/389,130, entitled "Embedded Meta-Carrier with Spread Spectrum for Periodic-Burst Carriers via Overlaid Carriers" to Michael Beeler et al., which was filed on Oct. 1, 2010, U.S. Provisional Patent Application No. 61/360,213, entitled "A Method for Transmission of Identification via Meta-data for Repeating Relays Using Spread-Spectrum Technology" to Frederick Morris, et al., which was filed on Jun. 30, 2010, and U.S. Provisional Patent Application No. 61/503,574, entitled "Meta-Carrier Embedding Technique with Improved Performance for BPSK, MSK, and O-QPSK Modulation" to Richard Hollingsworth Cannon, et al., which was filed on Jun. 30, 2011, the disclosures of which are hereby incorporated entirely by reference herein.

BACKGROUND

1. Technical Field

Aspects of this document relate generally to telecommunication systems and techniques for transmitting data across a telecommunication channel.

2. Background Art

Since the introduction of electromagnetic (EM) transmission, a recurring problem continuing to challenge the industry is the identification of the periodic-burst carrier. The problem is most prevalent in the Time Division Multiple Access (TDMA) Very Small Aperture Terminal (VSAT) satellite industry, but the technology described in this invention is not limited to burst TDMA VSAT satellite transmission systems. The need to identify a carrier signal may be due to failed equipment that results in the transmission equipment transmitting or sweeping the wrong spectral location or locations. In this event, this carrier is known as a "rogue carrier." A second need to identify a carrier signal may be due to an improperly configured carrier signal. An improperly configured carrier signal is primarily due to human error. In many situations, the rogue or improperly configured carrier signal results in service disruption due to interference with a carrier signal assigned to operate in the same occupied spectrum. Thus, a need exists for a method that provides the ability for someone skilled in the art to rapidly identify the source of the interfering carrier signal.

SUMMARY

Implementations of a method of embedding information within a burst carrier signal may comprise modulating meta-data using a modulator such that a meta-carrier signal results, lowering a Power Spectral Density (PSD) of the meta-carrier signal by Direct Sequence Spread Spectrum (DSSS) chipping the meta-carrier signal using a linear Pseudo-Random Number (PRN) sequence, embedding one or more modulated symbols of the meta-carrier signal within an unused portion of one or more quadrants of a modulation constellation of a burst carrier signal such that a composite carrier signal results, and synchronously transmitting the composite carrier signal using a transmitter such that symbols of the meta-carrier signal are synchronized with symbols of the burst carrier signal.

Particular implementations may comprise one or more of the following features. The method may further comprise modulating the burst carrier signal using a Binary-Phase Shift Keying (BPSK) modulation format. The embedding may further comprise embedding one or more additional chips of the meta-carrier signal within one or both unused portions of modulation constellation quadrants of the burst carrier signal. The method may further comprise modulating the burst carrier signal using a Minimum Shift Keying (MSK) modulation format. The embedding may further comprise embedding one or more additional chips of the meta-carrier signal at a rate equal to or higher than a rate at which symbol pairs are transmitted within the burst carrier signal. The method may further comprise modulating the burst carrier signal using an Offset-Quaternary Phase Shift Keying (O-QPSK) modulation format. The embedding may further comprise embedding one or more additional chips of the meta-carrier signal at a rate equal to or higher than a rate at which symbol pairs are transferred within the burst carrier signal. The Pseudo-Random Number (PRN) sequence may be a non-linear progression PRN sequence.

Implementations of a method of receiving and extracting embedded information from within a burst carrier signal may comprise receiving a composite carrier signal using a receiving device, the composite carrier signal comprising a burst carrier signal having one or more modulated symbols of a meta-carrier signal embedded within an unused portion of one or more quadrants of a modulation constellation of the burst carrier signal, wherein a Power Spectral Density (PSD) of the meta-carrier signal has been previously lowered by Direct Sequence Spread Spectrum (DSSS) chipping of the meta-carrier signal using a linear Pseudo-Random Number (PRN) sequence, estimating which one or more modulation constellation portions of the burst carrier signal was unused based on a predetermined modulation format of the burst carrier signal, and synchronously extracting the one or more embedded symbols of the meta-carrier signal from the one or more modulation constellation portions that are unused in the burst carrier signal based on the estimation of which of the one or more modulation constellation portions is unused for transmitting information in the burst carrier signal.

Particular implementations may comprise one or more of the following features. The extracting may further comprise extracting the one or more embedded symbols from the burst carrier signal having a Binary-Phase Shift Keying (BPSK) modulation format using a current state of one or more modulation constellation points and one or more phase-locked loops (PLL's) to locate the one or more embedded symbols within the burst carrier signal. The portion that is unused may comprise at least a portion of two unused modulation constellation quadrants and the extracting may further comprise extracting the one or more embedded symbols from the at least two modulation constellation quadrants that are unused. The extraction may further comprise extracting the one or more embedded symbols from the burst carrier signal having a Minimum Shift Keying (MSK) modulation format using a current state of a modulation constellation point to locate the one or more embedded symbols within the burst carrier signal. The extraction may further comprise extracting one or more additional chips of the meta-carrier signal from the composite carrier signal at a rate equal to or higher than a rate at which symbol pairs are transmitted within the burst carrier signal.

The extraction may further comprise extracting the one or more embedded symbols from the burst carrier signal having an Offset-Quaternary Phase Shift Keying (O-QPSK) modulation format using a current state of a modulation constellation point to locate the one or more embedded symbols within the burst carrier signal. The extraction may further comprise extracting one or more additional chips of the meta-carrier signal from the composite carrier signal at a rate equal to or higher than a rate at which symbol pairs are transmitted within the burst carrier signal. The method may further comprise despreading one or more DSSS chips from the one or more embedded symbols using a PRN sequence. The PRN sequence may be a non-linear progression PRN sequence. The method may further comprise creating phase coherence of the burst carrier signal using a constellation of the burst carrier signal. The method may further comprise demodulating the composite carrier signal using a standard demodulator. The method may further comprise cancelling the burst carrier signal using one or more cancellation techniques such that only the constellation of the embedded meta-carrier signal remains.

Implementations of a system for embedding information within a burst carrier signal may comprise a modulator configured to modulate meta-data such that a meta-carrier signal results, a spreading device configured to lower a Power Spectral Density (PSD) of the meta-carrier signal by Direct Sequence Spread Spectrum (DSSS) chipping the meta-carrier signal using a linear Pseudo-Random Number (PRN) sequence, an embedding device configured to embed one or more modulated symbols of the meta-carrier signal within one or more unused portions of one or more quadrants of a modulation constellation of the burst carrier signal such that a composite carrier signal results, and a transmitter configured to synchronously transmit the composite carrier signal such that symbols of the meta-carrier signal are synchronized with symbols of the burst carrier signal.

Particular implementations may comprise one or more of the following features. The system may further comprise a modulator configured to modulate the burst carrier signal using a Binary-Phase Shift Keying (BPSK) modulation format. The one or more unused portions of one or more quadrants of the modulation constellation comprise at least an unused portion of two modulation constellation quadrants and wherein the embedding device is further configured to embed one or more additional chips of the meta-carrier signal within the two unused modulation constellation quadrants of the burst carrier signal. The system may further comprise a modulator configured to modulate the burst carrier signal using a Minimum Shift Keying (MSK) modulation format. The embedding device may be further configured to embed one or more additional chips of the meta-carrier signal at a rate equal to or higher than a rate at which symbol pairs are transmitted within the burst carrier signal. The system may further comprise a modulator configured to modulate the burst carrier signal using an Offset-Quaternary Phase Shift Keying (O-QPSK) modulation format. The embedding device may be further configured to embed one or more additional chips of the meta-carrier signal at a rate equal to or higher than a rate at which symbol pairs are transferred within the burst carrier signal. The Pseudo-Random Number (PRN) sequence may be a non-linear progression PRN sequence.

Implementations of a system for receiving and extracting embedded information from within a burst carrier signal may comprise a receiving device configured to receive a composite carrier signal, the composite carrier signal comprising a burst carrier signal having one or more modulated symbols of a meta-carrier signal embedded within an unused portion of one or more quadrants of a modulation constellation of the burst carrier signal, wherein a Power Spectral Density (PSD) of the meta-carrier signal has been previously lowered by Direct Sequence Spread Spectrum (DSSS) chipping of the meta-carrier signal using a linear Pseudo-Random Number (PRN) sequence, a decoder configured to locate one or more modulation constellation portions of the burst carrier signal that are unused based on a predetermined modulation format of the burst carrier signal, and a processing device configured to reassemble the one or more embedded symbols of the meta-carrier signal synchronously extracted by the decoder from the burst carrier signal such that meta-data results.

Particular implementations may comprise one or more of the following features. The decoder may be further configured to extract the one or more embedded symbols from a burst carrier signal having a Binary-Phase Shift Keying (BPSK) modulation format using a current state of one or more modulation constellation points and one or more phase-locked loops (PLL's) to locate the one or more embedded symbols within the burst carrier signal. The decoder may be further configured to extract the one or more embedded symbols from the unused portion of one or both modulation constellation quadrants that are unused for transmitting information in the burst carrier signal. The decoder may be further configured to extract the one or more embedded symbols from a burst carrier signal having a Minimum Shift Keying (MSK) modulation format using a current state of a modulation constellation point to locate the one or more embedded symbols within the burst carrier signal. The decoder may be further configured to extract one or more additional chips of the meta-carrier signal from the composite carrier signal at a rate equal to or higher than a rate at which symbol pairs are transmitted within the burst carrier signal.

The decoder may be further configured to extract the one or more embedded symbols from a burst carrier signal having an Offset-Quaternary Phase Shift Keying (O-QPSK) modulation format using a current state of a modulation constellation point to locate the one or more embedded symbols within the burst carrier signal. The decoder may be further configured to extract one or more additional chips of the meta-carrier signal from the composite carrier signal at a rate equal to or higher than a rate at which symbol pairs are transmitted within the burst carrier signal. The system may further comprise a despreader configured to despread one or more DSSS chips from the one or more embedded symbols using a PRN sequence. The PRN sequence may be a non-linear progression PRN sequence. The receiving device may be further configured to create phase coherence of the burst carrier signal using a constellation of the burst carrier signal. The system may further comprise a standard demodulator configured to demodulate the composite carrier signal. The receiving device may be further configured to cancel the burst carrier signal using one or more cancellation techniques such that only the constellation of the embedded meta-carrier signal remains.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 3A-3E are representations of the prior art of an MSK or O-QPSK modulated constellations.

DESCRIPTION

Figure 1:
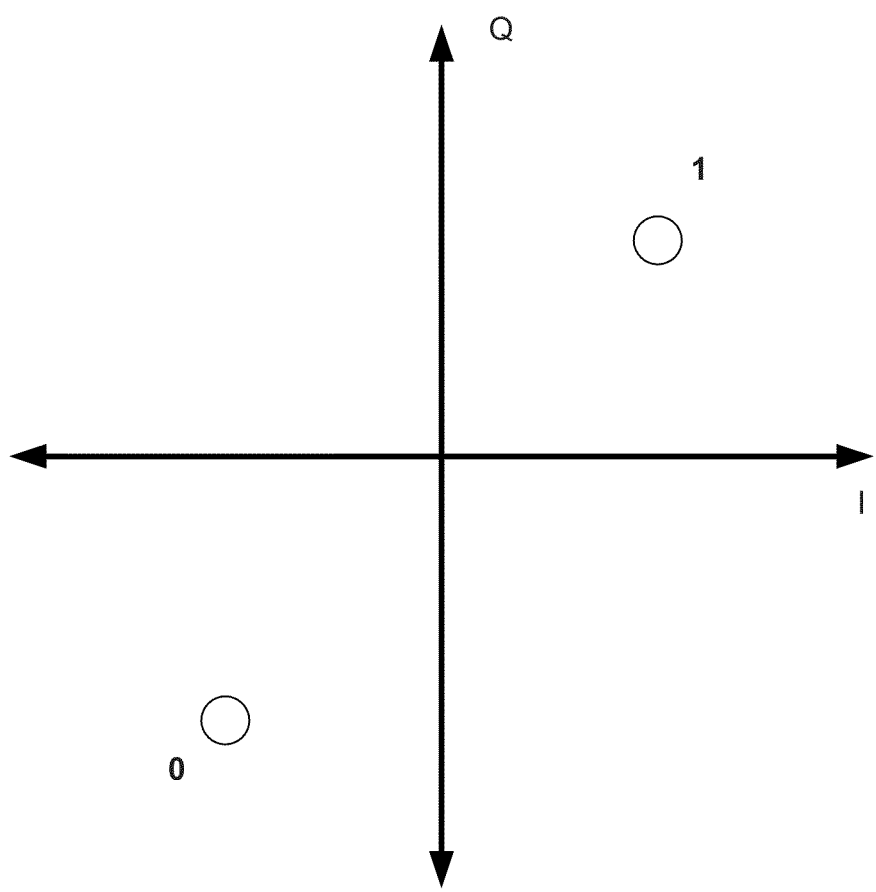
FIG. 1 is a representation of the prior art of a BPSK modulated constellation.

This disclosure, its aspects and implementations, are not limited to the specific components, frequency examples, or methods disclosed herein. Many additional components and assembly procedures known in the art consistent with meta-data embedding technique with improved performance for Binary Phase-Shift Keying (BPSK), Minimum-Shift Keying (MSK) and Offset-Quadrature Phase-Shift Keying (O-QPSK) are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to a method of embedding information into a periodic-burst carrier signal that uses BPSK, MSK or O-QPSK to help identify an electromagnetic transmission's origin, but the described method is not limited to only burst carrier signals. In a burst-carrier environment, the duration of the burst is small; typically, but not limited to, tens to a few thousand modulated symbols in duration so the amount of information transmitted is a limited number of bits, such as, by non-limiting example, less than 5 to 10 bits. The burst carrier signal may include information about the transmission equipment (for example, manufacturer, model, serial number, configuration, or any other relevant information). Methods may be employed for an electromagnetic emitting device that uses periodic-bursts, such as optical or Radio Frequency (RF) transmission equipment for point-to-point, point-to-multipoint and/or multipoint-to-multipoint for embedded information. This application is related to, and incorporates herein by reference, pending U.S. patent application Ser. No. 13/024,402, entitled "Embedded Meta-Carrier with Spread Spectrum Via Overlaid Carriers" to Michael Beeler, et al., which was filed on Feb. 10, 2011 and pending U.S. patent application Ser. No. 13/044,446, entitled "Embedded Meta-Carrier with Spread Spectrum for Periodic-Burst Carriers via Overlaid Carriers" to Michael Beeler, et al., which was filed on Mar. 9, 2011.

A method for embedding information about the burst carrier signal is accomplished by using a Pseudo-Random Number (PN) like sequence as a code sequence for providing a chipping sequence for producing a spread spectrum signal, and then using a portion of a quadrant(s) which may also be referred to as a wing(s) t of a BPSK, MSK or O-QPSK modulated waveform for adding the meta-data information to the final modulated waveform. The PN-like code sequence is used for chipping the meta-data to first lower the Power Spectral Density (PSD) of the meta-carrier signal containing the meta-data sequence to uniformly distribute the total power of the meta-carrier signal such that it provides minimal impact to the original burst-data carrier signal that the burst meta-carrier signal is being combined with. Secondly, the code sequence may act as a progression mechanism as to where a burst is in the PN code sequence for reassembly at the receiving end of the link.

BPSK, MSK or O-QPSK modulation always leaves a wing or wings (portion of a quadrant or quadrants) of the modulation constellation that is both predictable and unused and, therefore, may be used with a low-power modulation point for sending a modulated symbol containing meta-data in the unused portion of the constellation.

The described method may use a sequential sliding approach wherein the code sequence progresses one chip at a time through the code epoch, a step-sliding sequence where the code will be advanced to the next known point in the code, or a step-sliding sequence with a unique offset in which the code will be advanced to the next known point in the code for rapid detection by the remote receiving device for message reassembly of the received meta-data. The progression through the code sequence is directly proportional to the amount of time the burst aperture remains open.

The described methods assume the meta-data's data rate is a fraction of the data rate of the original-burst carrier signal's data rate. Combining the meta-carrier signal's spread spectrum carrier with the original-burst carrier signal results in a combined composite carrier signal that may be delivered to the original-burst carrier signal's demodulator with minimal impact to the signal quality while carrying information about the burst transmit terminal that may be extracted by a meta-data decoding device. The transmission of the composite carrier signal as well as the extraction of the symbols within the meta-carrier signal at the receiver are both coherent processes, meaning that the symbols within the meta-carrier signal are synchronous with the symbols in the original burst carrier signal.

The decoding device may coherently demodulate the embedded symbols containing the meta-data in a real time or non-real time processing device that receives the periodic composite bursts. Once the bursts are received, processing may be done in a real-time mode or the bursts may be digitized for storage and processing at a later time for non-real time processing.

This disclosure relates to, but is not limited to the insertion of meta-data from a burst type carrier signal using the unused wing or wings (portion of a quadrant or quadrants) in the constellation of a BPSK, MSK or O-QPSK modulated waveform for adding the meta-data information. Additionally, a PN spreading sequence may be used for both PSD reduction and as a tool for message reassembly. As an alternative embodiment, the burst meta-data information could be replaced with telemetry, coordinate (latitude and longitude manually entered or provided by a Global Positioning System (GPS) automatically), user data, etc. Particular implementations described herein are and may use, but are not limited to, Field-Programmable Gate Arrays (FPGA), Programmable Logic Devices (PLD), Programmable Integrated Circuits (PIC), Digital Signal Processors (DSP), Application Specific Integrated Circuits (ASIC) or microprocessors.

The use of a shared medium using Time Division Multiple Access (TDMA) is known in the art. The use of burst-like TDMA allows a terminal to burst for a duration over a shared medium for a given time (number of symbols) either allocated explicitly (assigned) or allocated to a number of terminals (opportunistically) for bursting over the time (number of symbols) allocated medium (spectrum). The methods described herein use the concept of the meta-data about the original carrier signal to provide information to a monitoring device to determine the identification of the original burst carrier signal. When using a TDMA architecture, the ability to transmit an entire message that would be of use for identifying the source of the transmitter may take more time (number of symbols) than would be allocated in a single TDMA burst. The described methods outline a mechanism for using the unused portion of the modulation constellation and reassembling a non-contiguous message using the attributes of a spread spectrum sequence for re-assembling the individual bursts into a contiguous message for identifying the transmission sources over the shared medium.

The methods disclosed herein assume that the channel may operate in a non-interfered configuration where each terminal bursts its information with no or minimal overlap, and in an interfered configuration where another terminal, similar or different technology, that may be occupying the medium causing inband interference.

Aspects of this disclosure relate to a method and system for using the unused portion of the modulation constellation of a BPSK, MSK or O-QPSK waveform for transmitting meta-data, and reception, burst demodulation, decoding and processing of the burst meta-data and the original burst carrier signal. The described methods may use BPSK, MSK or O-QPSK with direct sequence spread spectrum (DSSS) techniques to address both the power spectral density reduction of the burst meta-carrier signal and for the unique identification of the burst information for the processing and reassembling of the received meta-data messages.

Particular implementations of meta-data embedding techniques with improved performance for BPSK, MSK and O-QPSK, or any other appropriate modulation format disclosed herein may be specifically employed in satellite communications systems. However, as will be clear to those of ordinary skill in the art from this disclosure, the principles and aspects disclosed herein may readily be applied to any electromagnetic (IF, RF and optical) communications system, such as cellular phone or terrestrial broadcast network without undue experimentation.

Figure 2:
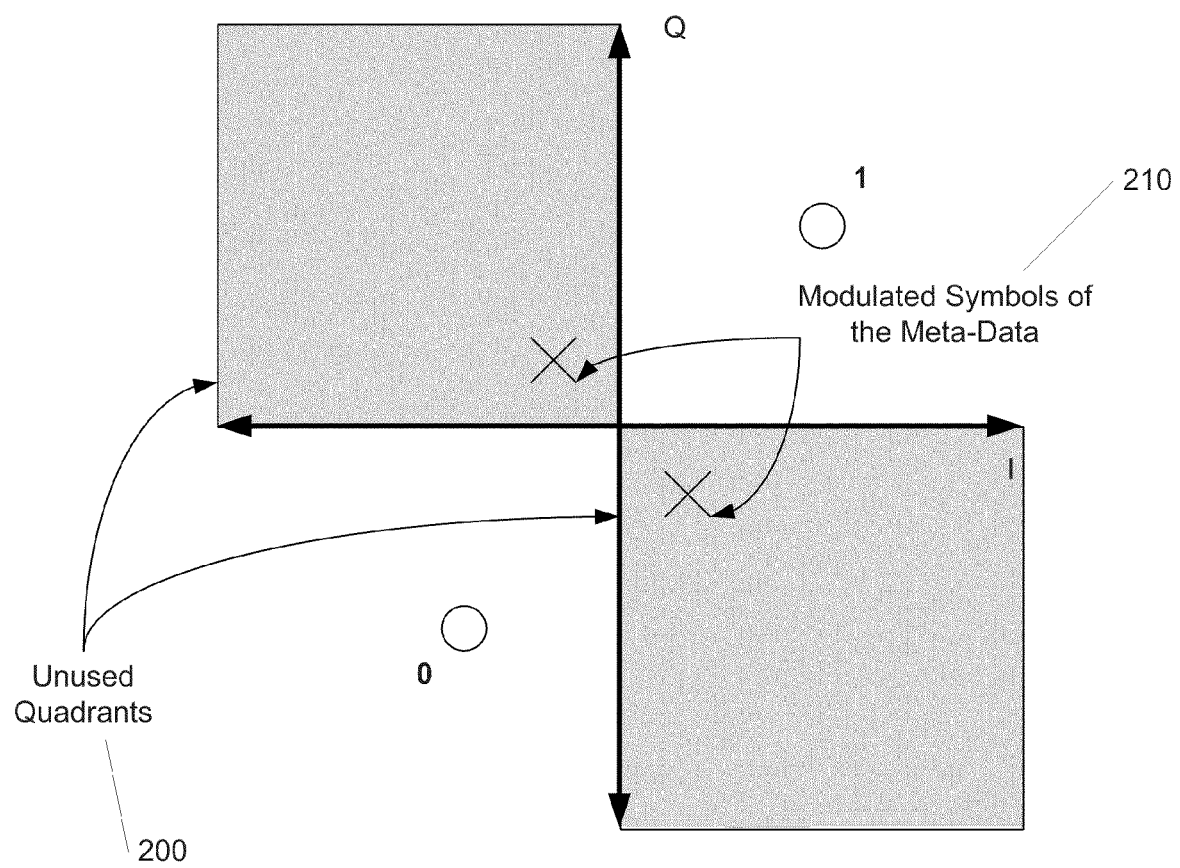
FIG. 2 is a representation of a BPSK modulated constellation showing two unused quadrants for embedding symbols containing meta-data.
Figure 4A:
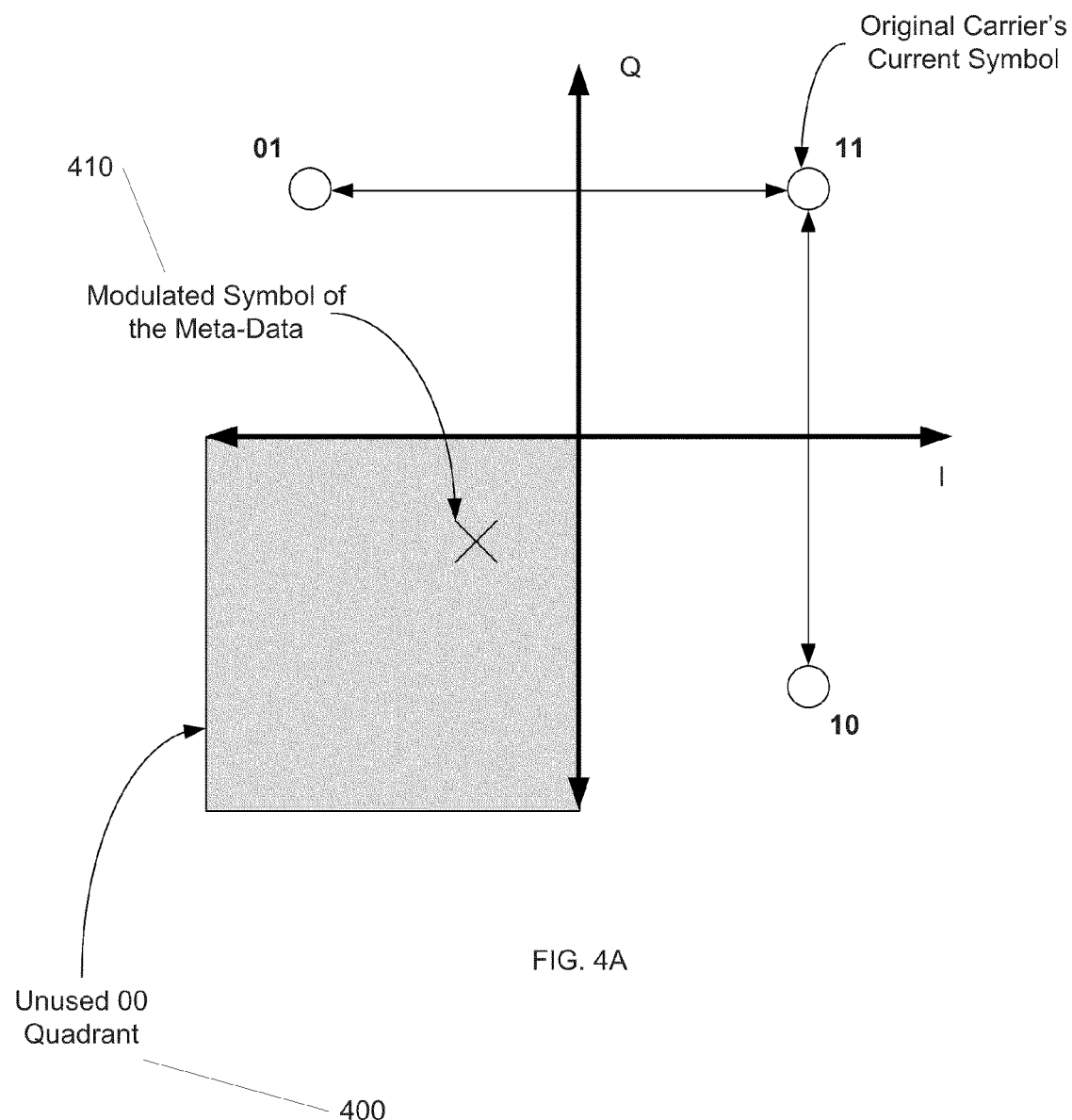
FIGS. 4A-4D are representations of implementations of unused MSK or O-QPSK modulated constellation showing the unused quadrants for embedding symbols containing meta-data.
Figure 4B:
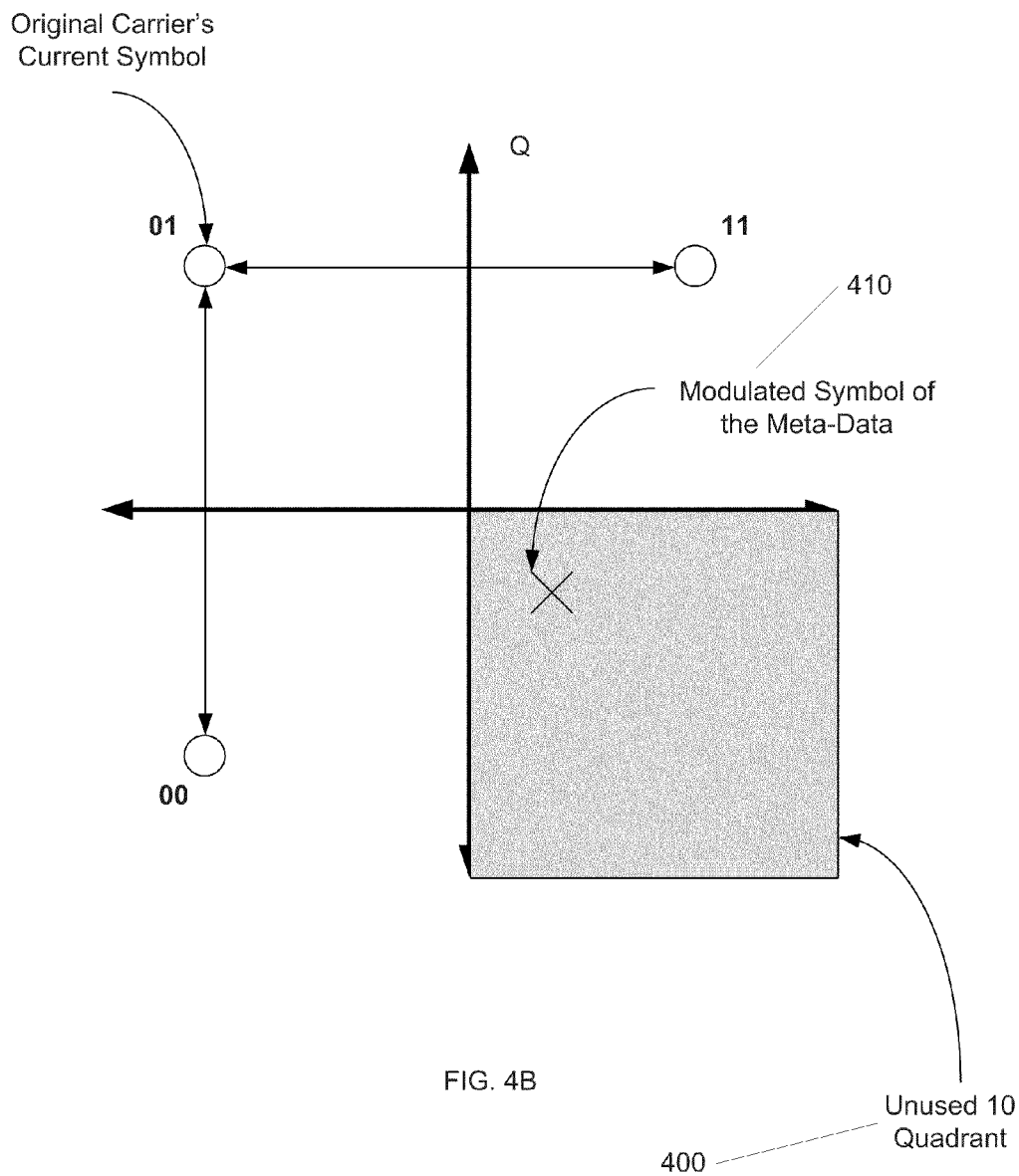
Figure 4C:
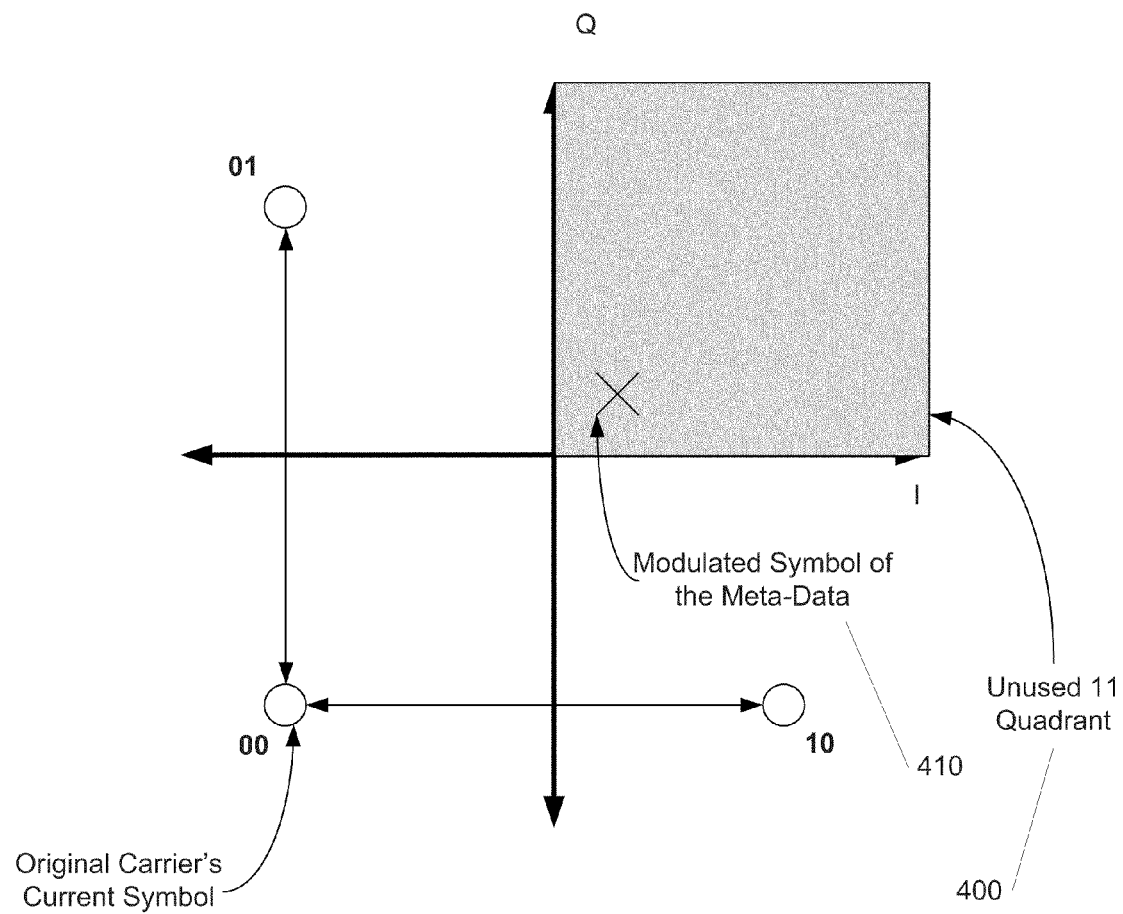
Figure 4D:
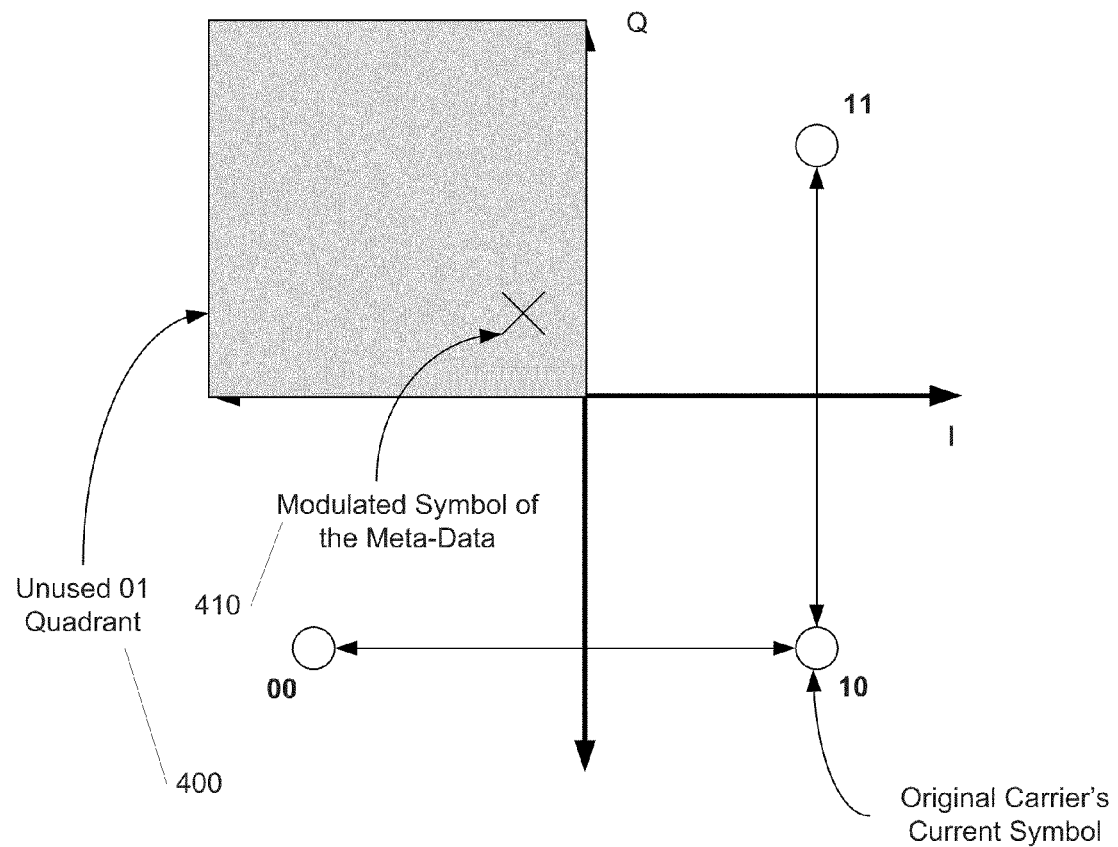

FIG. 1 illustrates the prior art of a particular implementation of a burst transmission carrier signal wherein the output has been BPSK modulated to IF/RF. In this diagram, the output of the modulating equipment contains a single modulated carrier $x_{orig}(t) = A \cos(\omega_c t + (2n-1)\pi/4)$, $n=1,3$ where $A = (2E_b/T_b)^{0.5}$ represented as $X_{orig}$ and may not contain information about the origin, configuration, etc. of the source transmission, or any embedded information. FIG. 2 illustrates the unused portions 200—wing or wings (portion of a quadrant or quadrants) of the BPSK constellation. In one embodiment, the unused quadrants may be used for embedding modulated meta-data 210 into the unused modulation quadrants 210.

FIGS. 3A-3E illustrate the prior art of a particular implementation of a burst transmission carrier signal wherein the output has been MSK or O-QPSK modulated to IF/RF. In the diagrams, the output of the modulating equipment contains a single modulated carrier signal and may not contain information about the origin, configuration, etc. of the source transmission, or any embedded information. The continuous constellation, as shown in FIG. 3B, demonstrates there is no zero crossing using MSK or O-QPSK modulation. Therefore, the next state of the modulation progression exhibits a "BPSK-like" characteristic so that the unused wing or wings (portion of a quadrant or quadrants) of the constellation may be used for inserting a meta-carrier symbol for implementing the described methods.

FIGS. 4A-4D illustrate the unused wing or wings portions 400 (portion of a quadrant or quadrants) of the MSK or O-QPSK constellation. When using MSK or O-QPSK modulation there is no "zero crossing" of the constellation, since these types of modulation techniques are known as constant envelope modulation. Therefore, when at the '11' state as shown in 4A, the only available transitions from '11' to other states are to '01' and '10'. This leaves the '00' quadrant for use of sending a modulated meta-data symbol 410. Additionally, when at the '01' state as shown in 4B, the only available transitions from '01' to other states are to '00' and '11'. This leaves the '10' quadrant for use of sending a modulated meta-data symbol 410. Additionally, when at the '00' state as shown in 4C, the only available transitions from '00' to other states are to '01' and '10'. This leaves the '11' quadrant for use of sending a modulated meta-data symbol 410. Lastly, when at the '10' state as shown in 4D, the only available transitions from '10' to other states are to '00' and '11'. This leaves the '01' quadrant for use of sending a modulated meta-data symbol 410. The meta-carrier needs to go into the "Q channel" when the "I channel" is open, and conversely, the meta-carrier signal would need to go into the "I channel" when the "Q channel" is open. For MSK or O-QPSK, it is necessary to send two chips per symbol.

As can be demonstrated in FIG. 2, two modulation wings 200 are available for embedding the modulated meta-data 210 into the unused modulation wings 200. FIGS. 4A to 4D provide one unused modulation wing 400 for each of the "deterministic" four possible states for an MSK or O-QPSK modulated waveform. In both the BPSK and MSK/O-QPSK modulation types, the bits that comprise the meta-data may be spread-spectrum (chipped) using a Direct Sequence Spread-Spectrum (DSSS) spreading technique resulting in lowering the power spectral density (PSD) to mitigate the impact of the embedded 410 and modulated meta-data constellation points being added to the original carrier signal.

Once the low-data rate meta-data is spread or chipped, the waveform may be combined with the original carrier signal's modulated constellation. As one skilled in the art would know, the low-data rate meta-data is then combined in with the original carrier signal to create a composite carrier signal. Therefore, knowing the spread factor, the processing gain, $G_p$, is defined as $10*Log(Spread Factor)$ in dB. The result is a signal that has been chipped by many tens, hundreds, or thousands of times, and the ratio of the original carrier signal, $X_{orig}$, to the spread meta-carrier signal, $S_{chipped}$, is many times greater than $X_{orig}$. For example, assuming an original burst carrier signal using BPSK with a $BW_{RF}$ of 256 KHz is provided and the burst meta-data uses a spread factor of 512, the processing gain, $G_p$, with a spread factor of 512 can be expressed in Decibels (dB) as $10 Log(512)=27.09$ dB. A 256 Ksps BPSK carrier signal can provide a data rate of 128 Kbps with a rate 1/2 Forward Error Correction (FEC). Using the unused modulation wings supports the user data rate of 128 Kbps of meta-data for transmission. The resulting meta-data rate with a 512 spread factor provides a meta-data rate of 128 Kbps/512=250 bits per second. For burst-carrier signals, it is common for burst lengths to be short. Assuming a burst length to be as small as 6,000 symbols, the resulting burst length would be around 0.0234 seconds. The resulting number of meta-data bits that would be transmitted would be 250 bps*6,000/256,000=5.85 bits.

As a second example, assuming an original burst carrier signal using MSK or O-QPSK with a $BW_{RF}$ of 256 KHz is provided, and the burst meta-data uses a spread factor of 512, the processing gain $G_p$ with a spread factor of 512 can be expressed in Decibels (dB) as $10 Log(512)=27.09$ dB. A 256 Ksps MSK or O-QPSK carrier can provide a data rate of 256 Kbps with a rate 1/2 FEC. Using the unused modulation wings supports the user with one quarter (¼) of the 256 Ksps which is 64 Ksps, but sending 2 chips per symbol or 128 Kcps of meta-data for transmission. A 256 Ksps carrier signal supporting a 1/2 FEC code can provide 256 Kbps of data throughput. The resulting meta-data rate with a 512 spread factor provides a meta-data rate of 128 Kcps/512=250 bits per second. For burst-carriers, it is common for burst lengths to be short. Assuming a burst length to be as small as 6,000 symbols, the resulting burst length would be around 0.0234 seconds. The resulting number of meta-data bits that would be transmitted would be 250 bps*6,000/256,000=5.85 bits.

Using an implementation of the described method, the power robbed from the original carrier signal is defined as:

Power reduction of original carrier in dB=$10*Log(1+10^{(Power Ratio in dB/10)})$.

The amount of noise contributed to the original carrier signal using the described method is defined as (where Carrier to Noise is (CNR)):

Carrier to Noise $(k)=10*Log [1/((\frac{1}{10}^{(CNRk/10)}-(10^{(Power Ratio in dB)/10)})]-CNR(k)$, where K is the modulation index and where 1=BPSK and 2=MSK or O-QPSK.

An implementation of the described method requires information about the duration of the burst to determine whether a burst is a candidate to have a meta-carrier signal embedded within the original carrier signal. A burst that contains a number of symbols that is below a minimum threshold may not be considered as a burst to have the meta-carrier signal embedded. Above this minimum threshold, however, the burst may have the meta-carrier signal embedded within.

Figure 5:
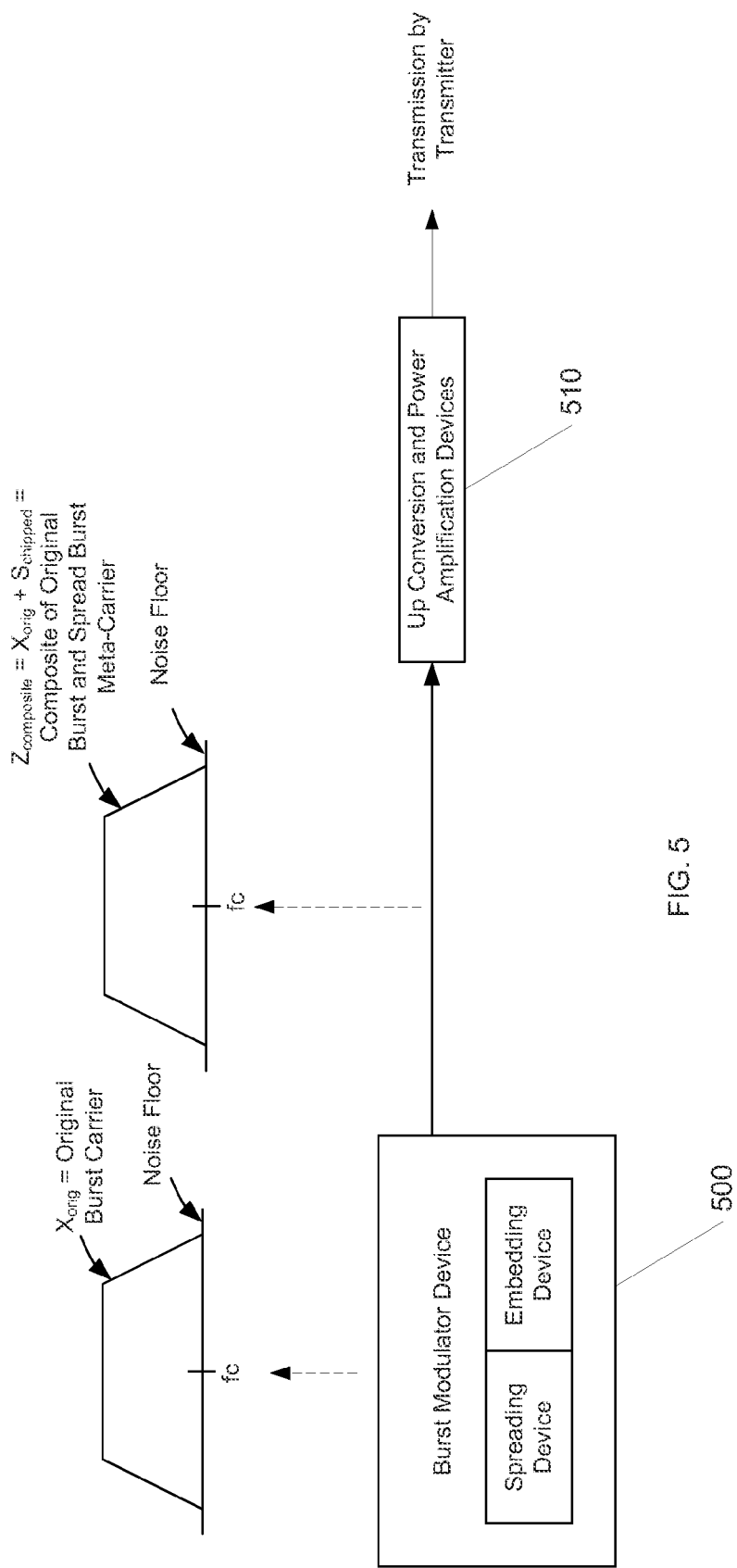
FIG. 5 is a block diagram showing an implementation of an embedding of a modulator that contains a meta-data embedding process.

FIG. 5 demonstrates how a modulator 500 may be configured to provide native burst modulation (BPSK or MSK/O-QPSK) functionality and include the embedding of the meta-data using implementations of the method described herein prior to upconversion and power amplification 510. The information contained in the burst meta-carrier signal may be small, since the duration of a burst is typically small as it is contains a limited number of symbols. Therefore, the information contained in the burst may be limited to a manufacturer identification number, model number, serial number or any other relevant information. The entire identification sequence may be limited, for example, to only 24 bits (or 3 bytes), and an allocation for one byte for Cyclic Redundancy Checking (CRC) for a total meta-data frame of 32 bits (or 4 bytes).

Figure 6:
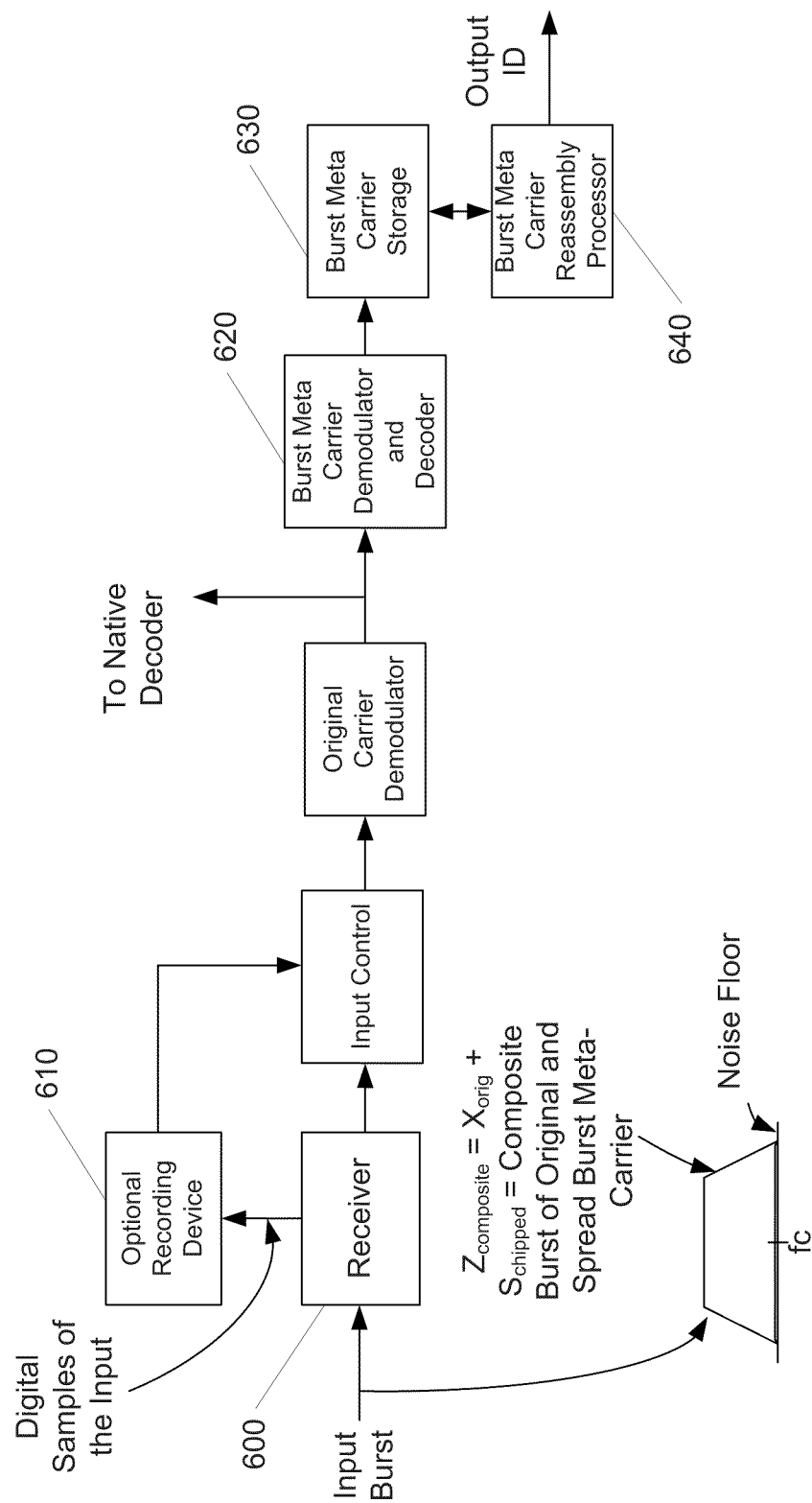
FIG. 6 is a block diagram depicting a receiving and decoding device using an implementation of the described method.

FIG. 6 demonstrates an implementation of a burst meta-carrier signal receiver 600. The input containing the composite carrier signal (original burst carrier signal and burst meta-data) may be received, converted to a digitally sampled signal and optionally stored in a recording or memory device 610.

At a receiver 600 designed to receive the original carrier signal, the composite carrier signal can be demodulated and decoded with no special provisions being required for receiving the original carrier signal. To receive and process the embedded meta-data by the receiver 600, with the sole purpose of processing the meta-data, the receiver section uses the same input as a receiver designed to receive the original carrier signal. The receiver 600 may be used to assist in steering the receiver's burst meta-carrier decoder 620 where the modulated meta-data symbols are located and so they may be extracted by the decoder 620.

The output of the burst meta-data decoder 620 is provided to the burst meta-data storage 630, where the meta-data fragments are stored for processing by the burst meta-carrier processor 640. Once a full meta-data message has been reassembled, the message may be output and memory reclaimed.

Figure 7:
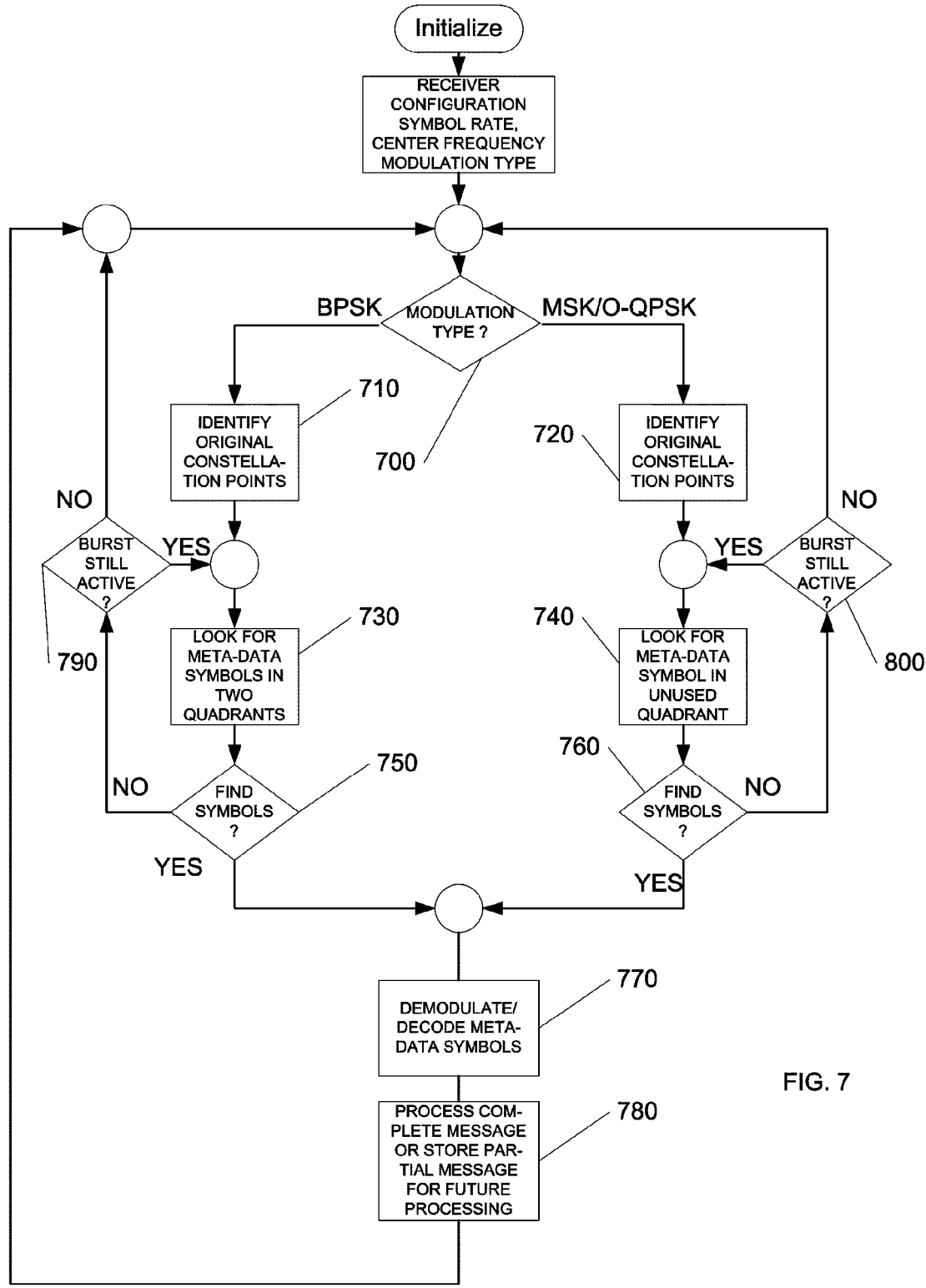
FIG. 7 is a logic flow diagram showing an implementation of the described method in use by a receiving device.

FIG. 7 provides a logic flow diagram of an implementation of the disclosed method as used by a receiving device. Once the modulation format is determined 700 to be BPSK, MSK, O-QPSK, or any other suitable modulation format, the receiver then identifies the original constellation points 710, 720 of the received signal and looks for meta-data symbols in two unused constellation quadrants 730 in the case of a BPSK modulation format or looks for a meta-data symbol in one unused constellation quadrant 740 in the case of an MSK or O-QPSK modulation format. If a symbol(s) is found 750, 760, the receiver then demodulates and decodes 770 the meta-data symbol(s) and processes a message 780 if a complete message has been received, otherwise, the symbol(s) is stored for future processing when the remainder of the message has been received. If a symbol(s) is not found 750, 760, the receiver determines whether the burst carrier signal is still active 790, 800 and if so, continues to look for a meta-data symbol(s) 730, 740 in the unused constellation quadrant(s).

The following are particular implementations of a method of embedding information into a periodic-burst carrier signal that uses BPSK, MSK or O-QPSK provided as non-limiting examples:

EXAMPLE 1

A satellite burst transmit station is configured to operate in a burst format at an assigned center frequency, occupied bandwidth and power level to a satellite. For this example, the satellite burst transmit station is configured to operate with an implementation of the method using the BPSK modulation. Meta-data is chipped and combined with a BPSK carrier signal in one of the unused modulation wing or wings (portion of a quadrant or quadrants) to provide modulated symbols of meta-data with the original carrier signal.

EXAMPLE 2

In particular implementations of the system described in Example 1, the meta-data is chipped and combined with a BPSK carrier signal in both of the unused modulation wing or wings (portion of a quadrant or quadrants) to provide modulated symbols of meta-data with the original carrier signal.

EXAMPLE 3

A satellite burst transmit station is configured to operate in a burst format at an assigned center frequency, occupied bandwidth and power level to a satellite. For this example, the satellite burst transmit station is configured to operate with an implementation of the method using the MSK modulation. Meta-data is chipped and combined with an MSK carrier signal in the unused modulation wing or wings (portion of a quadrant or quadrants) for each modulated symbol of the MSK transmission to provide modulated symbols of meta-data with the original carrier signal.

EXAMPLE 4

A satellite burst transmit station is configured to operate in a burst format at an assigned center frequency, occupied bandwidth and power level to a satellite. For this example, the satellite burst transmit station is configured to operate with an implementation of the disclosed method using the O-QPSK modulation. Meta-data is chipped and combined with an O-QPSK carrier signal in the unused modulation wing or wings (portion of a quadrant or quadrants) for each modulated symbol of the O-QPSK transmission, to provide modulated symbols of meta-data with the original carrier signal.

EXAMPLE 5

A receiving device configured to receive an original BPSK burst carrier signal receives the carrier signal with both the original carrier signal's symbols and the embedded meta-data symbols. The receiver does not have the ability to decode the embedded meta-data symbols, and will not be impacted by the presence of the meta-data symbols.

EXAMPLE 6

A receiving device configured to receive a BPSK burst carrier signal for the embedded meta-data symbols receives the carrier signal with both the original symbols and the embedded burst carrier signal. The meta-data receiver uses the original burst carrier signal's symbols to detect the proper phase angle, and then further decode the embedded meta-data symbols.

EXAMPLE 7

A receiving device configured to receive an original MSK burst carrier signal receives the carrier signal with both the original carrier signal's symbols and the embedded meta-data symbols. The receiver does not have the ability to decode the embedded meta-data symbols, and will not be impacted by the presence of the meta-data symbols.

EXAMPLE 8

A receiving device configured to receive an MSK burst carrier signal for the embedded meta-data symbols receives the carrier signal with both the original symbols and the embedded burst. The meta-data receiver uses the original burst carrier signal's symbols to detect the proper phase angle, and then further decode the embedded meta-data symbols.

EXAMPLE 9

A receiving device configured to receive an original O-QPSK burst carrier signal receives the carrier signal with both the original carrier signal's symbols and the embedded meta-data symbols. The receiver that does not have the ability to decode the embedded meta-data symbols, and will not be impacted by the presence of the meta-data symbols.

EXAMPLE 10

A receiving device configured to receive an O-QPSK burst carrier signal for the embedded meta-data symbols receives the carrier signal with both the original symbols and the embedded burst. The meta-data receiver uses the original burst carrier signal's symbols to detect the proper phase angle, and then further decode the embedded meta-data symbols.

EXAMPLE 11

A non-bursting satellite transmit station is configured to operate in a non-burst format at an assigned center frequency, occupied bandwidth and power level to a satellite. For this example, the satellite non-burst transmit station is configured to operate with the method using the BPSK modulation. Meta-data is chipped and combined with a BPSK carrier signal in one of the unused modulation wing or wings (portion of a quadrant or quadrants) to provide modulated symbols of meta-data with the original carrier signal.

EXAMPLE 12

In particular implementations of the system described in Example 11, the meta-data is chipped and combined with a BPSK carrier signal in both of the unused modulation wing or wings (portion of a quadrant or quadrants) to provide modulated symbols of meta-data with the original carrier signal.

EXAMPLE 13

A non-bursting satellite transmit station is configured to operate in a non-burst format at an assigned center frequency, occupied bandwidth and power level to a satellite. For this example, the satellite non-burst transmit station is configured to operate with the method using the MSK modulation. Meta-data is chipped and combined with an MSK carrier signal in the unused modulation wing or wings (portion of a quadrant or quadrants) for each modulated symbol of the MSK transmission, to provide modulated symbols of meta-data with the original carrier signal.

EXAMPLE 14

A non-bursting satellite transmit station is configured to operate in a non-burst format at an assigned center frequency, occupied bandwidth and power level to a satellite. For this example, the satellite non-burst transmit station is configured to operate with the method using the O-QPSK modulation. Meta-data is chipped and combined with an O-QPSK carrier signal in the unused modulation wing or wings (portion of a quadrant or quadrants) for each modulated symbol of the O-QPSK transmission, to provide modulated symbols of meta-data with the original carrier signal.

EXAMPLE 15

A receiving device configured to receive an original BPSK non-burst carrier signal receives the carrier signal with both the original carrier signal's symbols and the embedded meta-data symbols. The receiver that does not have the ability to decode the embedded meta-data symbols, and will not be impacted by the presence of the meta-data symbols.

EXAMPLE 16

A receiving device configured to receive a BPSK non-burst carrier signal for the embedded meta-data symbols receives the carrier signal with both the original symbols and the embedded non-burst carrier signal. The meta-data receiver uses the original non-burst carrier signal's symbols to detect the proper phase angle, and then further decode the embedded meta-data symbols.

EXAMPLE 17

A receiving device configured to receive an original MSK/O-QPSK non-burst carrier signal receives the carrier signal with both the original carrier signal's symbols and the embedded meta-data symbols. The receiver that does not have the ability to decode the embedded meta-data symbols, and will not be impacted by the presence of the meta-data symbols.

EXAMPLE 18

A receiving device configured to receive an O-QPSK non-burst carrier signal for the embedded meta-data symbols receives the carrier signal with both the original symbols and the embedded non-burst carrier signal. The meta-data receiver uses the original non-burst carrier signal's symbols to detect the proper phase angle, and then further decode the embedded meta-data symbols.

EXAMPLE 19

A receiving device configured to receive an MSK non-burst carrier signal for the embedded meta-data symbols receives the carrier signal with both the original symbols and the embedded non-burst carrier signal. The meta-data receiver uses the original non-burst carrier signal's symbols to detect the proper phase angle, and then further decode the embedded meta-data symbols.

EXAMPLE 20

A receiving device configured to receive an original MSK non-burst carrier signal receives the carrier signal with both the original carrier signal's symbols and the embedded meta-data symbols. The receiver that does not have the ability to decode the embedded meta-data symbols, and will not be impacted by the presence of the meta-data symbols.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of embedding information within a burst carrier signal, the method comprising:
    modulating meta-data using a modulator such that a meta-carrier signal results;
    lowering a Power Spectral Density (PSD) of the meta-carrier signal by Direct Sequence Spread Spectrum (DSSS) chipping the meta-carrier signal using a linear or non-linear Pseudo-Random Number (PRN) sequence;
    embedding one or more modulated symbols of the meta-carrier signal within an unused portion of one or more quadrants of a modulation constellation of a burst carrier signal such that a composite carrier signal results; and
    synchronously transmitting the composite carrier signal using a transmitter such that symbols of the meta-carrier signal are synchronized with symbols of the burst carrier signal.

2. The method of claim 1, further comprising modulating the burst carrier signal using a Binary-Phase Shift Keying (BPSK) modulation format.

3. The method of claim 2, wherein the embedding further comprises embedding one or more additional chips of the meta-carrier signal within the one or both unused portions of the modulation constellation quadrants of the burst carrier signal.

4. The method of claim 1, further comprising modulating the burst carrier signal using a Minimum Shift Keying (MSK) modulation format.

5. The method of claim 4, wherein the embedding further comprises embedding one or more additional chips of the meta-carrier signal at a rate equal to or higher than a rate at which symbol pairs are transmitted within the burst carrier signal.

6. The method of claim 1, further comprising modulating the burst carrier signal using an Offset-Quaternary Phase Shift Keying (O-QPSK) modulation format.

7. The method of claim 6, wherein the embedding further comprises embedding one or more additional chips of the meta-carrier signal at a rate equal to or higher than a rate at which symbol pairs are transmitted within the burst carrier signal.

8. The method of claim 1, wherein the Pseudo-Random Number (PRN) sequence is a non-linear progression PRN sequence.

9. A method of receiving and extracting embedded information from within a burst carrier signal comprising:
receiving a composite carrier signal using a receiving device, the composite carrier signal comprising a burst carrier signal having one or more modulated symbols of a meta-carrier signal embedded within an unused portion of one or more quadrants of a modulation constellation of the burst carrier signal, wherein a Power Spectral Density (PSD) of the meta-carrier signal has been previously lowered by Direct Sequence Spread Spectrum (DSSS) chipping of the meta-carrier signal using a linear or non-linear Pseudo-Random Number (PRN) sequence;
estimating which one or more modulation constellation portions of the burst carrier signal was unused based on a predetermined modulation format of the burst carrier signal; and
synchronously extracting the one or more embedded symbols of the meta-carrier signal from the one or more modulation constellation portions that are unused in the burst carrier signal based on the estimation of which of the one or more modulation constellation portions is unused for transmitting information in the burst carrier signal.

10. The method of claim 9, wherein the extracting further comprises extracting the one or more embedded symbols from the burst carrier signal having a Binary-Phase Shift Keying (BPSK) modulation format using a current state of one or more modulation constellation points and one or more phase-locked loops (PLL's) to locate the one or more embedded symbols within the burst carrier signal.

11. The method of claim 10, wherein the portion that is unused comprises at least a portion of at least two unused modulation constellation quadrants and the extracting further comprises extracting the one or more embedded symbols from the at least two modulation constellation quadrants that are unused.

12. The method of claim 9, wherein the extracting further comprises extracting the one or more embedded symbols from the burst carrier signal having a Minimum Shift Keying (MSK) modulation format using a current state of a modulation constellation point to locate the one or more embedded symbols within the burst carrier signal.

13. The method of claim 12, wherein the extracting further comprises extracting one or more additional chips of the meta-carrier signal from the composite carrier signal at a rate equal to or higher than a rate at which symbol pairs are transmitted within the burst carrier signal.

14. The method of claim 9, wherein the extracting further comprises extracting the one or more embedded symbols from the burst carrier signal having a Offset-Quaternary Phase Shift Keying (O-QPSK) modulation format using a current state of a modulation constellation point to locate the one or more embedded symbols within the burst carrier signal.

15. The method of claim 14, wherein the extracting further comprises extracting one or more additional chips of the meta-carrier signal from the composite carrier signal at a rate equal to or higher than a rate at which symbol pairs are transmitted within the burst carrier signal.

16. The method of claim 9, further comprising de-spreading one or more DSSS chips from the one or more embedded symbols using the PRN sequence.

17. The method of claim 16, wherein the PRN sequence is a non-linear progression PRN sequence.

18. The method of claim 9, further comprising creating phase coherence of the burst carrier signal using the constellation of the burst carrier signal.

19. The method of claim 9, further comprising demodulating the composite carrier signal using a standard demodulator.

20. The method of claim 19, further comprising cancelling the burst carrier signal using one or more cancellation techniques such that only the constellation of the embedded meta-carrier signal remains.

21. A system for embedding information within a burst carrier signal, the system comprising:
a modulator configured to modulate meta-data such that a meta-carrier signal results;
a spreading device configured to lower a Power Spectral Density (PSD) of the meta-carrier signal by Direct Sequence Spread Spectrum (DSSS) chipping the meta-carrier signal using a linear or non-linear Pseudo-Random Number (PRN) sequence;
an embedding device configured to embed one or more modulated symbols of the meta-carrier signal within one or more unused portions of one or more quadrants of a modulation constellation of the burst carrier signal such that a composite carrier signal results; and
a transmitter configured to synchronously transmit the composite carrier signal such that symbols of the meta-carrier signal are synchronized with symbols of the burst carrier signal.

22. The system of claim 21, further comprising a modulator configured to modulate the burst carrier signal using a Binary-Phase Shift Keying (BPSK) modulation format.

23. The system of claim 22, wherein the one or more unused portions of the one or more quadrants of the modulation constellation comprise at least an unused portion of two modulation constellation quadrants and wherein the embedding device is further configured to embed one or more additional chips of the meta-carrier signal within the two unused modulation constellation quadrants of the burst carrier signal.

24. The system of claim 21, further comprising a modulator configured to modulate the burst carrier signal using a Minimum Shift Keying (MSK) modulation format.

25. The system of claim 24, wherein the embedding device is further configured to embed one or more additional chips of the meta-carrier signal at a rate equal to or higher than a rate at which symbol pairs are transmitted within the burst carrier signal.

26. The system of claim 21, further comprising a modulator configured to modulate the burst carrier signal using an Offset-Quaternary Phase Shift Keying (O-QPSK) modulation format.

27. The system of claim 26, wherein the embedding device is further configured to embed one or more additional chips of the meta-carrier signal at a rate equal to or higher than a rate at which symbol pairs are transmitted within the burst carrier signal.

28. The system of claim 21, wherein the Pseudo-Random Number (PRN) sequence is a non-linear progression PRN sequence.

29. A system for receiving and extracting embedded information from within a burst carrier signal comprising:
a receiving device configured to receive a composite carrier signal, the composite carrier signal comprising a burst carrier signal having one or more modulated symbols of a meta-carrier signal embedded within an unused portion of one or more quadrants of a modulation constellation of the burst carrier signal, wherein a Power Spectral Density (PSD) of the meta-carrier signal has been previously lowered by Direct Sequence Spread Spectrum (DSSS) chipping of the meta-carrier signal using a linear or non-linear Pseudo-Random Number (PRN) sequence;
a decoder configured to locate one or more modulation constellation portions of the burst carrier signal that are unused based on a predetermined modulation format of the burst carrier signal; and
a processing device configured to reassemble the one or more embedded symbols of the meta-carrier signal synchronously extracted by the decoder from the burst carrier signal such that meta-data results.

30. The system of claim 29, wherein the decoder is further configured to extract the one or more embedded symbols from the burst carrier signal having a Binary-Phase Shift Keying (BPSK) modulation format using a current state of one or more modulation constellation points and one or more phase-locked loops (PLL's) to locate the one or more embedded symbols within the burst carrier signal.

31. The system of claim 30, wherein the decoder is further configured to extract the one or more embedded symbols from the unused portion of the one or both modulation constellation quadrants that are unused for transmitting information in the burst carrier signal.

32. The system of claim 29, wherein the decoder is further configured to extract the one or more embedded symbols from the burst carrier signal having a Minimum Shift Keying (MSK) modulation format using a current state of a modulation constellation point to locate the one or more embedded symbols within the burst carrier signal.

33. The system of claim 32, wherein the decoder is further configured to extract one or more additional chips of the meta-carrier signal from the composite carrier signal at a rate equal to or higher than a rate at which symbol pairs are transmitted within the burst carrier signal.

34. The system of claim 29, wherein the decoder is further configured to extract the one or more embedded symbols from the burst carrier signal having an Offset-Quaternary Phase Shift Keying (O-QPSK) modulation format using a current state of a modulation constellation point to locate the one or more embedded symbols within the burst carrier signal.

35. The system of claim 34, wherein the decoder is further configured to extract one or more additional chips of the meta-carrier signal from the composite carrier signal at a rate equal to or higher than a rate at which symbol pairs are transmitted within the burst carrier signal.

36. The system of claim 29, further comprising a despreader configured to despread one or more DSSS chips from the one or more embedded symbols using the PRN sequence.

37. The system of claim 30, wherein the PRN sequence is a non-linear progression PRN sequence.

38. The system of claim 29, wherein the receiving device is further configured to create phase coherence of the burst carrier signal using the constellation of the burst carrier signal.

39. The system of claim 29, further comprising a standard demodulator configured to demodulate the composite carrier signal.

40. The system of claim 39, wherein the receiving device is further configured to cancel the burst carrier signal using one or more cancellation techniques such that only the constellation of the embedded meta-carrier signal remains.

* * * * *